(12) United States Patent
Kwak et al.

(10) Patent No.: US 12,072,567 B2
(45) Date of Patent: Aug. 27, 2024

(54) STACKED DISPLAY APPARATUS COMPRISING FIRST AND SECOND DISPLAY PANELS AND HAVING A RATIO OF A FIRST AND A SECOND MAXIMUM SPATIAL FREQUENCY THAT IS OUTSIDE A PREDETERMINED RANGE AND IMAGE PROVIDING METHOD

(71) Applicant: SAMSUNG ELECTRONICS CO., LTD., Suwon-si (KR)

(72) Inventors: Jaehee Kwak, Suwon-si (KR); Jaesung Lee, Suwon-si (KR); Seyong Kwon, Suwon-si (KR); Youngjin Yoon, Suwon-si (KR); Kyungmin Lim, Suwon-si (KR); Kangwon Jeon, Suwon-si (KR); Bora Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 463 days.

(21) Appl. No.: 17/432,804

(22) PCT Filed: Aug. 3, 2021

(86) PCT No.: PCT/KR2021/010098
§ 371 (c)(1),
(2) Date: Aug. 20, 2021

(87) PCT Pub. No.: WO2022/039415
PCT Pub. Date: Feb. 24, 2022

(65) Prior Publication Data
US 2023/0136336 A1    May 4, 2023

(30) Foreign Application Priority Data
Aug. 21, 2020    (KR) .......................... 10-2020-0105638

(51) Int. Cl.
*G02F 1/1335*    (2006.01)
*G02F 1/13357*    (2006.01)
*G09G 3/3208*    (2016.01)

(52) U.S. Cl.
CPC ...... *G02F 1/133504* (2013.01); *G02F 1/1336* (2013.01); *G09G 3/3208* (2013.01); *G09G 2300/023* (2013.01); *G09G 2320/02* (2013.01)

(58) Field of Classification Search
None
See application file for complete search history.

(56) References Cited

U.S. PATENT DOCUMENTS 7,916,223 B2    3/2011    Kitagawa et al.
8,009,248 B2    8/2011    Nakai et al.
(Continued)

FOREIGN PATENT DOCUMENTS

CN    111258175 A  *  6/2020    ....... G02F 1/133516
JP    2007-310376 A    11/2007
(Continued)

OTHER PUBLICATIONS

Takahashi, K., et al., "From Focal Stack to Tensor Light-Field Display", IEEE Transactions on Image Processing, vol. 27, No. 9, Sep. 2018, pp. 4571-4584.
(Continued)

*Primary Examiner* — Paul C Lee
(74) *Attorney, Agent, or Firm* — Sughrue Mion, PLLC

(57) ABSTRACT

A stacked display apparatus and a method of operating the same are provided. The stacked display apparatus includes a first display panel in a form of a first aperture shape, and a second display panel in a form of a second aperture shape that is different from the first aperture shape, the second display panel being stacked on the first display panel, and a ratio of a first maximum spatial frequency of the first (Continued)

aperture shape and a second maximum spatial frequency of the second aperture shape is outside a predetermined range.

15 Claims, 21 Drawing Sheets

(56) References Cited

U.S. PATENT DOCUMENTS

| | | | |
|---|---|---|---|
| 8,045,098 B2 | 10/2011 | Kitagawa et al. | |
| 8,102,487 B2 | 1/2012 | Kitagawa et al. | |
| 8,848,006 B2 | 9/2014 | Wetzstein et al. | |
| 10,070,118 B2 | 9/2018 | Baran et al. | |
| 10,379,370 B2 | 8/2019 | Bell et al. | |
| 10,645,375 B2 | 5/2020 | Baran et al. | |
| 10,999,572 B2 | 5/2021 | Baran et al. | |
| 2006/0290594 A1* | 12/2006 | Engel | H04N 13/395 348/E13.057 |
| 2007/0242028 A1 | 10/2007 | Kitagawa et al. | |
| 2009/0147186 A1 | 6/2009 | Nakai et al. | |
| 2011/0075070 A1 | 3/2011 | Kitagawa et al. | |
| 2011/0141405 A1 | 6/2011 | Kitagawa et al. | |
| 2011/0261268 A1 | 10/2011 | Nakai et al. | |
| 2015/0310798 A1 | 10/2015 | Heide et al. | |
| 2017/0085867 A1 | 3/2017 | Baran et al. | |
| 2017/0124931 A1 | 5/2017 | Bell et al. | |
| 2017/0221195 A1 | 8/2017 | Iwami | |
| 2018/0188551 A1* | 7/2018 | Liu | G02B 30/25 |
| 2018/0275438 A1 | 9/2018 | Mori et al. | |
| 2019/0098290 A1 | 3/2019 | Baran et al. | |
| 2020/0244948 A1 | 7/2020 | Baran et al. | |
| 2021/0258562 A1 | 8/2021 | Baran et al. | |

FOREIGN PATENT DOCUMENTS

| | | | |
|---|---|---|---|
| JP | 2011-76107 A | 4/2011 | |
| JP | 5224230 B2 | 7/2013 | |
| KR | 10-2007-0045533 A | 5/2007 | |
| KR | 10-2007-0103321 A | 10/2007 | |
| KR | 1020170076551 A | 7/2017 | |
| KR | 10-2018-0084749 A | 7/2018 | |
| KR | 10-2018-0103989 A | 9/2018 | |
| KR | 1020180102049 A | 9/2018 | |
| KR | 1020180102252 A | 9/2018 | |
| KR | 10-1958288 B1 | 3/2019 | |
| KR | 10-2020-0077286 A | 6/2020 | |
| WO | 2017/125875 A1 | 7/2017 | |

OTHER PUBLICATIONS

Extended European Search Report dated Oct. 16, 2023 issued by the European Patent Office in Counterpart European Application No. 21858502.4.
International Search Report dated Nov. 24, 2021 issued by the International Searching Authority in counterpart International Application No. PCT/KR2021/010098 (PCT/ISA/210).
International Written Opinion dated Nov. 24, 2021 issued by the International Searching Authority in counterpart International Application No. PCT/KR2021/010098 (PCT/ISA/237).

* cited by examiner

STACKED DISPLAY APPARATUS COMPRISING FIRST AND SECOND DISPLAY PANELS AND HAVING A RATIO OF A FIRST AND A SECOND MAXIMUM SPATIAL FREQUENCY THAT IS OUTSIDE A PREDETERMINED RANGE AND IMAGE PROVIDING METHOD

TECHNICAL FIELD

The disclosure relates to a stacked display apparatus and a method of providing an image thereof. More particularly, the disclosure relates to a stacked display apparatus including a plurality of display panels having different aperture shapes and a method of providing an image thereof.

CROSS-REFERENCE TO RELATED APPLICATION

This application is based on and claims priority under 35 U.S.C. § 119 to Korean Patent Application No. 10-2020-0105638, filed on Aug. 21, 2020, in the Korean Intellectual Property Office, the disclosure of which is incorporated by reference herein in its entirety.

BACKGROUND ART

A moire phenomenon may occur due to physical characteristics of each of a plurality of display panels in a stacked display apparatus. The moire phenomenon is a phenomenon in which water ripples are observed in a display apparatus, and an interference fringe generated by two or more periodic water ripples overlapping due to light interference according to wave nature of light.

When a plurality of display panels of a stacked display apparatus are the same, light passing through each of the display panels may have the same or similar wavelength, and accordingly, interference of light may occur. In other words, when light having the same or similar wavelengths overlap, constructive interference may occur when phases of the two wavelengths are the same, and destructive interference may occur when the phases of the two wavelengths are opposite, resulting in the moire phenomenon.

Conventionally, a method of disposing a diffuser film between a plurality of display panels of a stacked display apparatus has been used in order to reduce the moiré phenomenon. However, when the diffuser film is disposed, due to a transmittance of the diffuser film, an intensity of light may be lowered, resulting in a blurring phenomenon, which may result in deterioration of image quality.

DISCLOSURE

Technical Problem

Provided is a stacked display apparatus including a plurality of display panels with different aperture shapes indicating an arrangement or size of pixels of the display panels.

Technical Solution

According to an embodiment, there is provided a stacked display apparatus including: a first display panel in a form of a first aperture shape; and a second display panel in a form of a second aperture shape that is different from the first aperture shape, the second display panel being stacked on the first display panel, wherein a ratio of a first maximum spatial frequency of the first aperture shape and a second maximum spatial frequency of the second aperture shape is outside a predetermined range.

The stacked display apparatus further includes a back light unit, and the first display panel is stacked on the back light unit.

The apparatus further includes: a third display panel in a form of a third aperture and stacked on the second display panel, wherein a ratio of a third maximum spatial frequency and the first maximum spatial frequency is outside the predetermined range, and a ratio of the third maximum spatial frequency and the second spatial maximum frequency is outside the predetermined range.

The first maximum spatial frequency is obtained by analyzing a frequency component of first data on the first aperture shape obtained through measuring a first optical profile of the first display panel, and the second maximum spatial frequency is obtained by analyzing a frequency component of second data on the second aperture shape obtained through measuring a second optical profile of the second display panel.

Each of the first data on the first aperture shape and the second data on the second aperture shape comprises a plurality of step functions.

A first image is configured to be provided through the first display panel, and a second image is configured to be provided through the second display panel, and the first image and the second image are obtained by converting a light field (LF) image.

A diffuser film is not disposed between the first display panel and the second display panel.

The first display panel is a super-in-plane switching (S-IPS) panel, and the second display panel is a plane to line switching (PLS) panel.

The predetermined range is from 0.97 to 1.03.

A type of the first display panel and a type of the second display panel is different from each other.

A resolution of the first display panel and a resolution of the second display panel is different from each other.

A method of expressing color by the first display panel and a method of expressing color by the second display panel is different from each other.

An opening ratio of the first display panel and an opening ratio of the second display panel is different from each other.

According to an embodiment, there is provided a method of providing an image of a stacked display apparatus including: providing a first image through a first display panel in a form of a first aperture shape; and providing a second image through a second display panel in a form of a second aperture shape that is different from the first aperture shape, the second display panel being stacked on the first display panel, wherein a ratio of a first maximum spatial frequency of the first aperture shape and a second maximum spatial frequency of the second aperture shape is outside a predetermined range.

The first image and the second image are obtained by converting a light field (LF) image.

According to various embodiments of the disclosure, a moire phenomenon may be reduced by providing an image through a stacked display apparatus including a plurality of display panels with different aperture shapes.

DETAILED DESCRIPTION

A stacked display apparatus according to one nor more embodiments of the disclosure may be implemented by stacking two or more display panels, and render an image reflecting a 3D depth with an image being displayed on each of the two or more display panels. Specifically, the stacked display apparatus may display different images on each of a plurality of display panels to provide an image reflecting a visual depth due to a difference in physical displacement between the display panels. As an example, the stacked display apparatus may render and display a plurality of light field (LF) images photographed by a light field (LF) camera. Herein, the stacked display apparatus may be referred to as an LF display apparatus.

Figure 1:
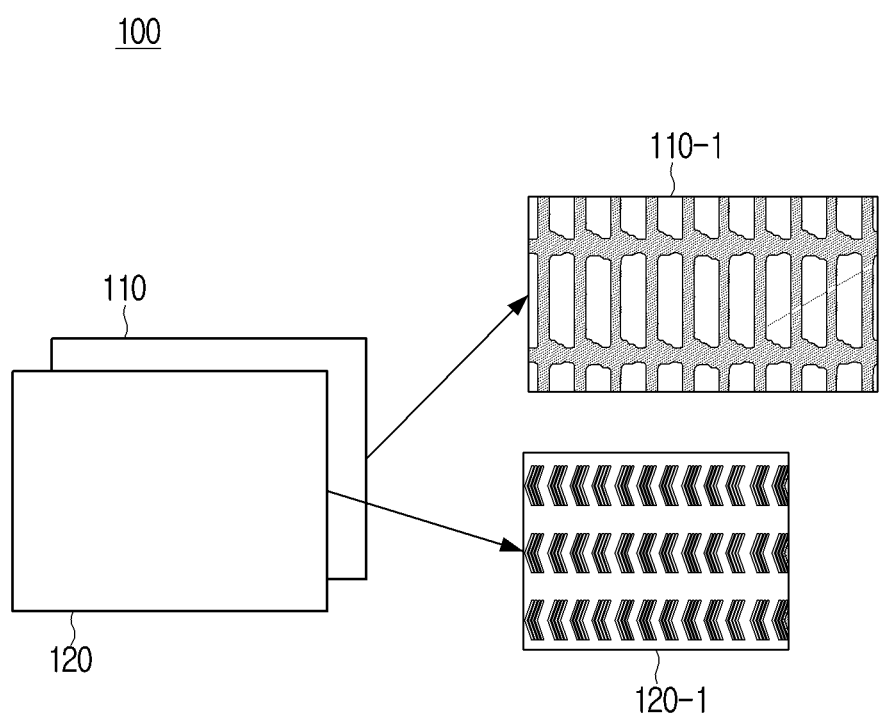
FIG. 1 is a view illustrating a stacked display apparatus including two display panels according to an embodiment.

FIG. 1 is a diagram illustrating a stacked display apparatus 100 including two display panels according to an embodiment.

The stacked display apparatus 100 may include a plurality of display panels. FIG. 1 illustrates a stacked display apparatus 100 including two display panels according to an embodiment. Referring to FIG. 1, the stacked display apparatus 100 may include a first display panel 110 and a second display panel 120. In addition, the second display panel 120 may be stacked on the first display panel 110.

As an example, the first display panel 110 and the second display panel 120 may be implemented as a liquid crystal display (LCD) panel. When the first display panel 110 and the second display panel 120 are implemented as a liquid crystal display (LCD) panel, the stacked display apparatus 100 may further include a backlight unit. The backlight unit is a component for irradiating light onto a display panel. In other words, the backlight unit of the stacked display apparatus 100 is a component for irradiating light to the first display panel 110 and the second display panel 120. As an example, when the stacked display apparatus 100 includes the backlight unit, the first display panel 110 may be stacked on the backlight unit.

The backlight unit may include a light guide plate, an optical sheet, and a light source, and the light source may be implemented as a light emitting diode (LED) or cold cathode fluorescent lamp (CCFL). In addition, the backlight unit may be implemented as an edge-lit type in which a light source is disposed on the side of the light guide plate to indirectly irradiate light to the display panel, or a direct-lit type in which the light source is disposed behind the display panel.

As another example, the first display panel 110 and the second display panel 120 may also be implemented as organic light emitting diodes (OLEDs) panels. When the first and second display panels 110 and 120 are implemented as organic light emitting diodes (OLEDs) panels, the stacked display apparatus 100 may not include a backlight unit. In other words, light may be irradiated from each organic light emitting diodes (OLED) panel itself without the backlight unit.

Referring to FIG. 1, the first display panel 110 may have a form of a first aperture shape 110-1. The second display panel 120 may have a form of second aperture shape 120-1 that is different from the first aperture shape 110-1.

The aperture according to the one or more embodiments of the disclosure may mean an area in which light is emitted from one pixel to the outside. In addition, the aperture shape according to the one or more embodiments may mean a shape of an area (aperture) in which light is emitted to the outside of the display panel. The aperture shape may vary according to an arrangement of pixels and a size of one pixel. In other words, referring to FIG. 1, the first display panel 110 may include the first aperture shape 110-1 according to the arrangement and size of pixels of the first display panel 110, and the second display panel 120 may include the second aperture shape 120-1 according to the arrangement and size of pixels of the second display panel 120.

A pixel may refer to a unit for displaying an image, and a display panel in the stacked display apparatus 100 may display an image through a plurality of pixels. As an example, the display panel may include a pixel representing a first color, a pixel representing a second color, and a pixel representing a third color, and a color may be expressed by mixing the first color, the second color, and the third color.

In addition, the arrangement and size of pixels in the display may vary according to type, resolution, color expression method, and aperture ratio of the display panel. In other words, the aperture shape may be determined according to the type, resolution, color expression method, and aperture ratio of the display panel. Accordingly, display panels having different types, resolutions, color expression methods, and/or aperture ratios may have different aperture shapes. In addition, as the degree of difference between aperture shapes of the display panels increases, the moire phenomenon of the stacked display apparatus 100 may be reduced.

According to an embodiment, the degree to which the aperture shape of each of the two display panels (e.g., the first display panel 110 and the second display panel 120) is different may be identified through a maximum spatial frequency according to the aperture shape. Spatial frequency refers to the number of times the same structure is repeated per unit length when structures of a certain shape and pattern are repeated according to positions and are spatially arranged. In addition, the largest value among the spatial frequencies of each aperture shape may be defined as the maximum spatial frequency. In addition, the spatial frequency according to the one or more embodiments may represent an arrangement of apertures (or an area) through which light is emitted from the display panel to the outside.

Moreover, when the two aperture shapes are different, the maximum spatial frequencies of each aperture shape may be different. Specifically, as the degree of difference between the two aperture shapes becomes greater, the difference between each of the maximum spatial frequencies according to the two aperture shapes may become larger. Accordingly, the degree to which the aperture shape for each display panel is different may be identified through the maximum spatial frequency according to the aperture shape.

For example, when a ratio (p) of a first maximum spatial frequency of the first aperture shape and a second maximum spatial frequency of the second aperture shape deviates more from a predetermined range (e.g., 0.97 to 1.03), it means that each of the aperture shapes of the first display panel 110 and the second display panel 120 is different by a greater degree.

As an example, the first maximum spatial frequency may be obtained through frequency domain analysis of data on the first aperture shape of the first display panel, and the second maximum spatial frequency may be obtained through frequency domain analysis of data on the second aperture shape of the second display panel.

Specifically, data on an aperture shape of the display panel may be obtained through measurement of an optical profile of the display panel. The optical profile measurement according to the one or more embodiments may be a method of measuring a shape of a contrast that appears along a line in an image of one pixel that emits light in a display panel.

The data on the aperture shape is data representing the spatial frequency according to an arrangement shape of the display panel. As an example, the data on the shape of the aperture obtained through the measurement of the optical profile may include function values for an area of one cut line among the image photographing pixels of the display panel. For example, function values for the area of one line may be 0 or 1. For example, the data of the aperture shape may include function values in which an area of the cut line that passes light is represented by 1, and an area that does not pass light is represented by 0. In other words, when data on the aperture shape is plotted along the cut line, a shape in which a plurality of step functions are superimposed may appear. That is, the data on the aperture shape may be data including the step function shape. Details of the data on the aperture shape and the light profile will be described below with reference to FIGS. 4A to 4D.

When data on the aperture shape of the display panel is obtained through optical profile measurement on the display panel, frequency domain analysis is performed on the data on the aperture shape, and the maximum spatial frequency according to the aperture shape may be obtained. As an example, frequency component analysis may be performed through a fast Fourier transform (FFT) method. The fast Fourier transform is a mathematical technique that decomposes data into frequency components.

As an example, a fast Fourier transform is performed on data for the first aperture shape to obtain a two-dimensional FFT spectrum, and through the corresponding FFT spectrum, a spatial frequency domain of the first aperture shape may be identified. The largest spatial frequency among the identified spatial frequency domains may be identified as the first maximum spatial frequency. A specific method of identifying the maximum spatial frequency through a two-dimensional FFT spectrum will be described below with reference to FIGS. 5A to 5D.

The second maximum spatial frequency may be obtained in the same manner as the first maximum spatial frequency. That is, the fast Fourier transform of the data for the second aperture shape may be performed to obtain a two-dimensional FFT spectrum, and the largest spatial frequency among the spatial frequency domains of the corresponding FFT spectrum may be identified as the second maximum spatial frequency.

In addition, when the ratio ρ of the first maximum spatial frequency of the first display panel 110 having the first aperture shape and the second maximum spatial frequency of the second display panel 120 having the second aperture shape is outside the predetermined range, the moire phenomenon of the stacked display apparatus 100 may be reduced. As an example, the predetermined range may be 0.97 to 1.03, and the meaning outside the predetermined range may indicate less than 0.97 and/or greater than 1.03.

According to an embodiment, the ratio of the first maximum spatial frequency and the second maximum spatial frequency may be defined as p, and p may be expressed by Equation 1.

$$\rho = \frac{\lambda 1}{\lambda 2} = \frac{f2}{f1} \qquad \text{[Equation 1]}$$

In Equation 1, $f^1$ may represent a first maximum spatial frequency value, and $f^2$ may represent a second maximum spatial frequency value.

The reciprocal of $f^1$ is $\lambda 1$ and represents a wavelength with respect to the maximum frequency corresponding to $f^1$, the reciprocal of $f^2$ is $\lambda 2$ and represents a wavelength with respect to the maximum frequency corresponding to $f^2$.

In an embodiment of the disclosure, when the ratio ρ of the first maximum spatial frequency and the second maximum spatial frequency is outside a predetermined range, that is, 0.97 to 1.03, the moiré phenomenon may be reduced. According to an embodiment, the first display panel 110 may be one from among a plane to line switching (PLS) panel and an advanced multi-domain vertical alignment (AMVA) panel, and the second display panel 120 may be a panel different from that of the first display panel 110 among the PLS panel and the AMVA panel, and the ratio ρ of the first maximum spatial frequency and the second maximum spatial frequency may be measured as 1.03.

Also, when the first display panel 110 is any one of a S-IPS panel and a PLS panel, and the second display panel 120 is a panel different from the first display panel 110 from among the S-IPS panel and the PLS panel, the ratio ρ of the first maximum spatial frequency and the second maximum spatial frequency may be measured as 1.27.

As an example, the greater the degree to which the p value deviates from the predetermined range (0.97 to 1.03), the greater the effect of reducing the moiré phenomenon may be. In other words, compared to the case when each of the stacked display panels is implemented by the PLS panel and a multi-domain vertical alignment (MVA) panel, the moire reduction effect may be greater in the case when implemented by the S-IPS panel and the PLS panel. The moire reduction effect according to the p value will be described below with reference to FIG. 7.

In an embodiment of the disclosure, a diffuser film may not be disposed between the first display panel 110 and the second display panel 120 in the stacked display apparatus 100. Conventionally, the diffuser plate is disposed between the display panels in order to reduce the moiré phenomenon that occurs in a stacked type display, but when the diffuser film is disposed, an intensity of light decreases due to a transmittance of the diffuser film, resulting in blurring which cases a problem that a quality of images was deteriorated. Accordingly, since the stacked display 100 according to the disclosure includes the first display panel 110 and the second display panel 120 having different aperture shapes, the moire phenomenon may be deteriorated without the diffuser film being disposed.

In FIG. 1, the stacked display apparatus 100 is illustrated as including two display panels 110 and 120, but is not limited thereto. In other words, the stacked display apparatus 100 according to the disclosure may include three or more display panels. As an example, when the stacked display apparatus 100 includes three display panels, the stacked display apparatus 100 may further include a third display panel stacked on the second display panel 120. In addition, the third display panel may have a form of a third aperture shape, and may have a third maximum spatial frequency according to the third aperture shape. In addition, a ratio of the third maximum spatial frequency to the first maximum spatial frequency, and a ratio of the third maximum spatial frequency to the second maximum spatial frequency may be outside the predetermined range (e.g., 0.97 to 1.03).

Figure 2A:
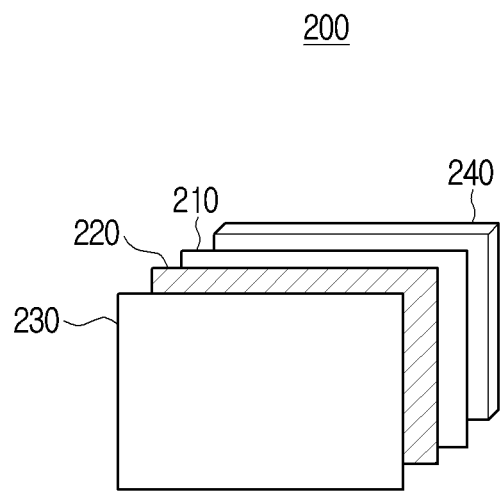
FIG. 2A is a front view of a stacked display apparatus having three display panels according to an embodiment.
Figure 2B:
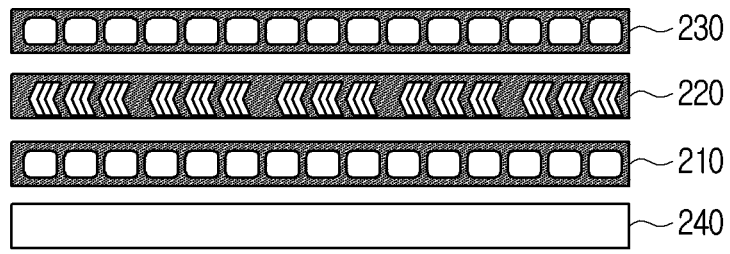
FIG. 2B is a cross-sectional view of a stacked display apparatus having three display panels according to an embodiment.

FIG. 2A is a front view of a stacked display apparatus having three display panels according to an embodiment of the disclosure, and FIG. 2B is a cross-sectional view of a stacked display apparatus having three display panels according to an embodiment of the disclosure.

The stacked display apparatus 200 of FIGS. 2A and 2B may include three LCD display panels 210, 220, 230 and a backlight 240. In addition, the first display panel 210 and the third display panel 230 may have a form of a first aperture shape, and the second display panel 220 may have a form of a second aperture shape.

As an example, the first display panel 210 and the third display panel 230 may be the same type of panel, and the type of the second display panel 220 may be different from the type of the first display panel 210 and the third display panel 230.

The type of panel according to the disclosure may be identified by at least one from among a pixel electrode, a common electrode, and an arrangement of a liquid crystal layer in the display panel, a dielectric anisotropy of a liquid crystal, and an initial orientation direction of a liquid crystal. As an example, the LCD display panel may include a twisted nematic (TN) panel, a vertical alignment (VA) panel, multi-domain vertical alignment (MVA) panel, in-plane switching (IPS) panel, plane to line switching (PLS) panel, fringing field switching (FFS) panel, or the like. For example, the first display panel 210 and the third display panel 230 of the stacked display apparatus 200 of FIGS. 2A and 2B may be twisted nematic (TN) panels, and the second display panel 220 may be an super-IPS (S-IPS) panel.

FIG. 2B illustrates a case where the type of the second display panel 220 of the stacked display apparatus 200 is different from the first display panel 210 and the third display panel 230. However, the stacked display apparatus according to the one or more embodiments may not only include the case where the types of display panels are different, but also various embodiments in which the aperture shape of the display panel may be different.

In other words, in another embodiment, the first display panel 210 and the third display panel 230 may have the same resolution, and a resolution of the second display panel 220 may be different from the resolution of the first display panel 210 and the third display panel 230. For example, the first display panel 210, the second display panel 220, and the third display panel 230 may all be TN panels, and the first display panel 210 and the third display panel 230 may have a resolution of FHD, and the second display panel 220 may be a TN panel having a UHD resolution.

In another embodiment, the first display panel 210 and the third display panel 230 may be a panel composed of pixels having three colors of Red, Green, Blue (RGB), and the second display panel 220 may be a panel composed of only pixels having one single color among RGB. That is, the second display panel 220 may have a different method of expressing color from the first display panel 210 and the third display panel 230.

In other words, the first display panel 210 and the third display panel 230 may be display panels having a first aperture shape, and the second display panel 220 may be a display panel having a second aperture shape, and the aperture shape of the display panel may be identified by the type, resolution, color expression method, and aperture ratio of each display panel.

In addition, it has been described that the aperture shape of the first display panel 210 and the third display panel 230 may be the first aperture shape, and the aperture shape of the second display panel 220 may be the second aperture shape, in the description above, but is not limited thereto. The aperture shapes of the first display panel 210, the second display panel 220, and the third display panel 230 may be different from each other. Also, the first display panel 210 and the second display panel 220 may have the first aperture shape, and the third display panel 230 may have the second aperture shape. Alternatively, the second display panel 220 and the third display panel 230 may have the first aperture shape, and the first display panel 210 may have the second aperture shape.

Figure 3A:
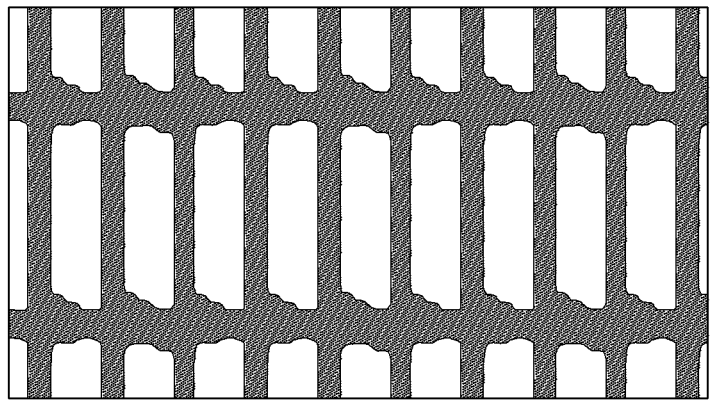
FIG. 3A is a view illustrating an aperture shape of a twisted nematic (TN) panel according to an embodiment.
Figure 3B:
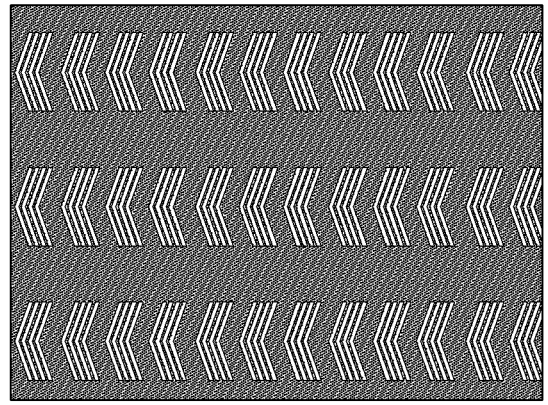
FIG. 3B is a view illustrating an aperture shape of a Super-In-Plane-Switching (S-IPS) panel according to an embodiment.
Figure 3C:
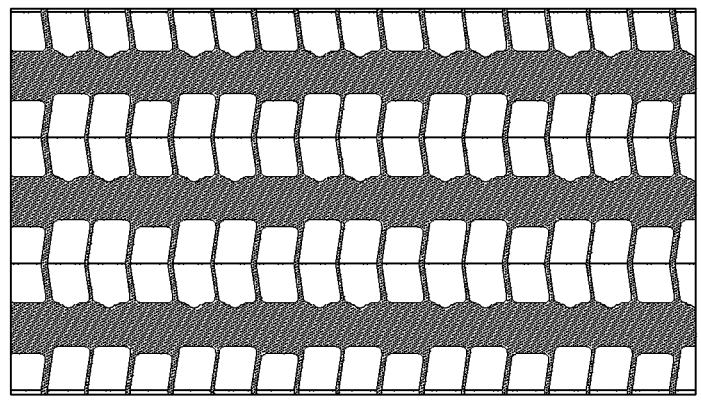
FIG. 3C is a view illustrating an aperture shape of a Plane to Line Switching (PLS) panel according to an embodiment.
Figure 3D:
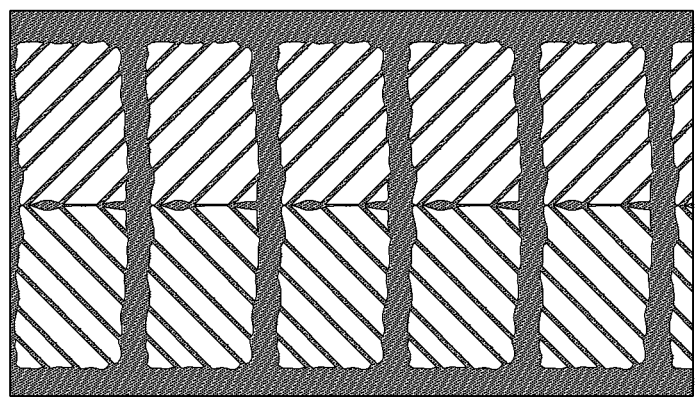
FIG. 3D is a view illustrating an aperture shape of a Patterned Vertical Alignment (PVA) panel according to an embodiment.
Figure 3E:
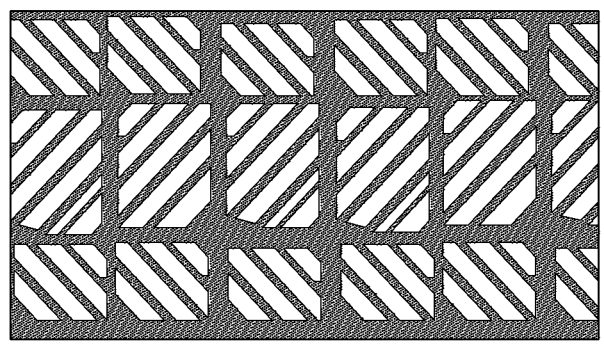
FIG. 3E is a view illustrating an aperture shape of a Multi-domain Vertical Alignment (MVA) panel according to an embodiment.
Figure 3F:
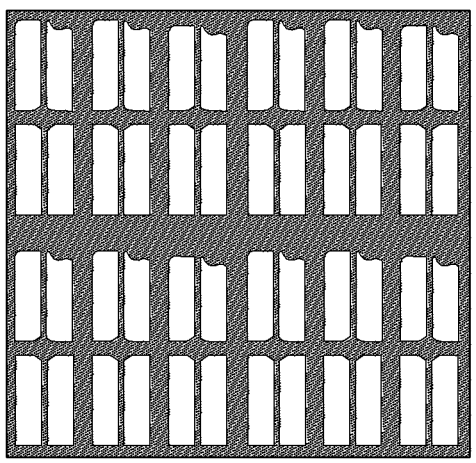
FIG. 3F is a view illustrating an aperture shape of an Advanced Multi-domain Vertical Alignment (AMVA) panel according to an embodiment.
Figure 3G:
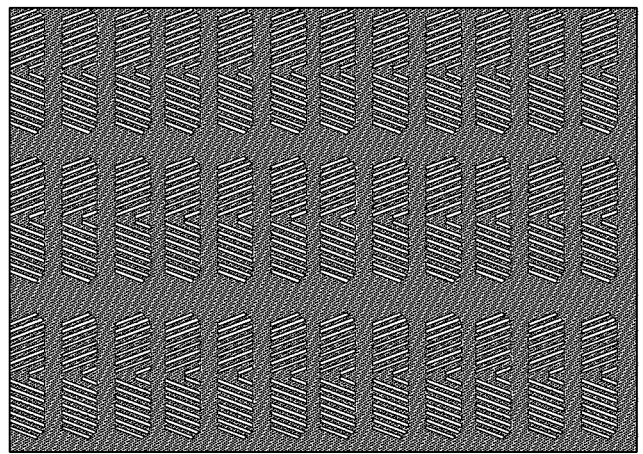
FIG. 3G is a view illustrating an aperture shape of a Horizon-In-Plane-Switching (H-IPS) panel according to an embodiment.

FIG. 3A is a view illustrating an aperture shape of a twisted nematic (TN) panel according to an embodiment, and FIG. 3B is a view illustrating an aperture shape of an S-IPS (Super-IPS) panel according to an embodiment, FIG. 3C is a view illustrating an aperture shape of a PLS panel according to an embodiment, FIG. 3D is a view illustrating an aperture shape of a PVA panel according to an embodiment, FIG. 3E is a view illustrating an aperture shape of an MVA panel according to an embodiment, FIG. 3F is a view illustrating an aperture shape of an AMVA panel according to an embodiment, and FIG. 3G is a view illustrating an aperture shape of an H-IPS panel according to an embodiment.

As illustrated in FIGS. 3A to 3G, if the types of display panels are different, the aperture shape of each display panel may be different. As an example, the aperture shape of each display panel may be identified through image photographing pixels that emit light in each display panel.

In addition, when two display panels having different degrees of aperture shape are used, the moire reduction effect of the stacked display apparatus 100 may be large.

For example, one pixel of the TN panel of FIG. 3A has a trapezoidal shape, and light may be emitted to the outside in all areas within one pixel. In addition, one pixel of the S-IPS panel of FIG. 3B has a hatched shape, and may include an area within which light is not emitted to the outside.

Assuming that a difference between the aperture shape of the S-IPS panel of FIG. 3B and the aperture shape of the PLS panel of FIG. 3C is the largest among the panels of FIGS. 3A to 3G, the moire reduction effect may be the greatest when the first display panel is the PLS panel, and the second display panel is the S-IPS panel.

In addition, assuming that a difference between the aperture shape of the TN panel of FIG. 3A and the aperture shape of the PLS panel of FIG. 3C among the panels of FIGS. 3A to 3G is the smallest, the moire reduction effect may be relatively small when the first display panel is the TN panel, and the second display panel is the PLS panel.

Hereinafter, a method of specifically measuring different degrees of the aperture shape will be described with reference to FIGS. 4A to 6.

Figure 4A:
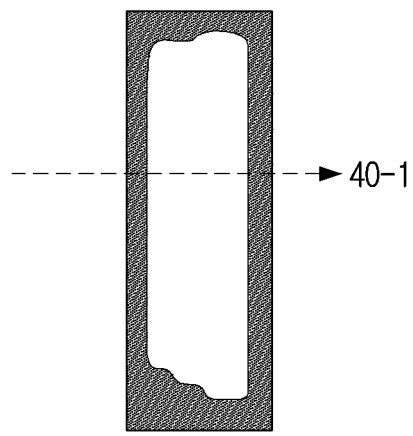
FIG. 4A is a view illustrating an aperture shape of one pixel in a TN panel according to an embodiment.
Figure 4B:
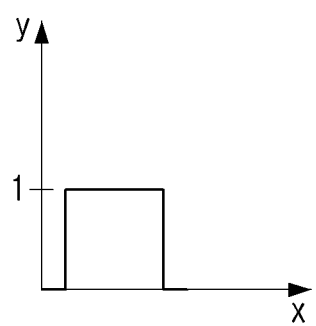
FIG. 4B is a view illustrating a function of a spatial frequency according to the aperture shape of FIG. 4A, according to an embodiment.

FIG. 4A is a view illustrating an aperture shape of one pixel in a TN panel according to an embodiment, and FIG. 4B is a view illustrating a function shape for a spatial frequency according to the aperture shape of FIG. 4A.

Figure 4C:
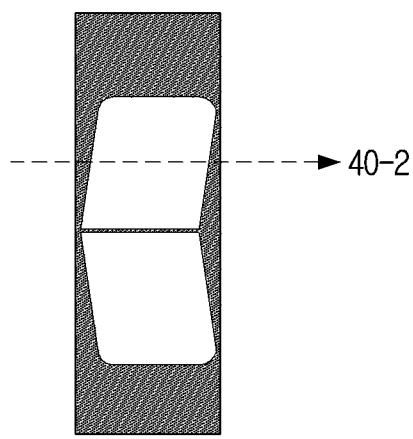
FIG. 4C is a view illustrating an aperture shape of a pixel in a PLS panel according to an embodiment.
Figure 4D:
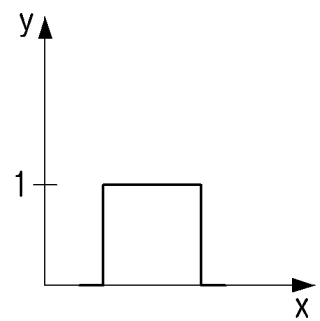
FIG. 4D is a view illustrating a function of a spatial frequency according to the aperture shape of FIG. 4C, according to an embodiment.

FIG. 4C is a view illustrating an aperture shape of a pixel in a PLS panel according to an embodiment, and FIG. 4D is a view illustrating a function shape for a spatial frequency according to the aperture shape of FIG. 4C;

FIG. 4A illustrates an image of one pixel emitting light in the TN panel by measuring an optical profile for one pixel in the TN panel.

In addition, first data on the shape of a first aperture of one pixel of the TN panel may be obtained by measuring the optical profile of the TN panel. In other words, the first data is data representing a shape of light and dark appearing along one line 40-1 of an image photographing one pixel emitting light in the TN panel of FIG. 4A.

As illustrated in FIG. 4B, the first data includes function values with respect to an area of one line 40-1 of the image photographing one pixel emitting light in the TN panel, and the function value may be 0 or 1. In other words, the first data may include function values in which an area that passes light is 1, and an area that does not pass light is 0, in the area of one line 40-1 in the image photographing one pixel in the TN panel of FIG. 4A, and when plotting along one line 40-1, it may take a form of a step function consisting of three sections.

FIG. 4C is an image of one pixel emitting light in the PLS panel by measuring an optical profile for one pixel in the PLS panel.

Second data on the shape of the second aperture of one pixel of the PLS panel may be obtained by measuring the optical profile of the PLS panel. In other words, the second data is data representing a light-dark shape that appears along one line 40-2 of the image photographing one pixel that is emitting light in the PLS panel of FIG. 4C.

As illustrated in FIG. 4D, the second data includes function values with respect to an area of one line 40-2 of the image photographing one pixel emitting light in the PLS panel, and the function value may be 0 or 1. In other words, the second data may include function values in which an area that passes light is 1, and an area that does not pass light is 0, among the area of one line 40-2 in the image photographing one pixel in the PLS panel of FIG. 4C, and when plotting along one line 40-2, it may take a form of a step function consisting of three sections.

Specifically, the function form of the first data in FIG. 4B and the second data in FIG. 4D is a function form plotted along lines 40-1 and 40-2 in an X-axis, and may be a step function consisting of three sections. In addition, since the aperture shapes for the one line 40-1 in FIG. 4A and for the one line 40-2 in FIG. 4C are similar, the first data and the second data may have similar function shapes.

Figure 5A:
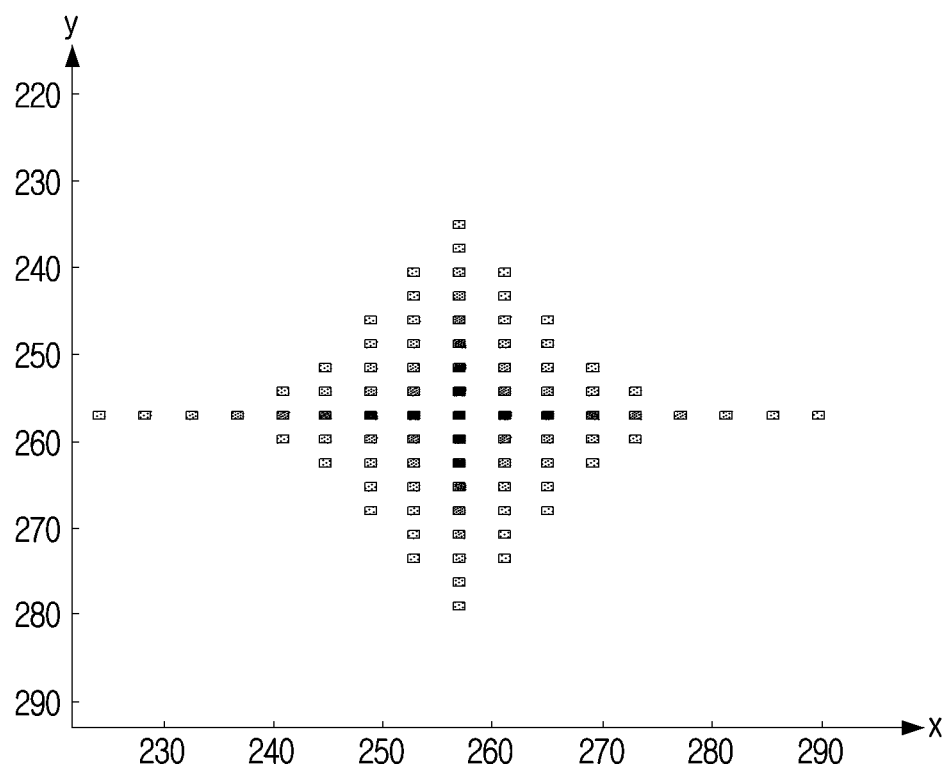
FIG. 5A is a view illustrating a two-dimensional Fast Fourier Transform (FFT) spectrum for a TN panel according to an embodiment.
Figure 5B:
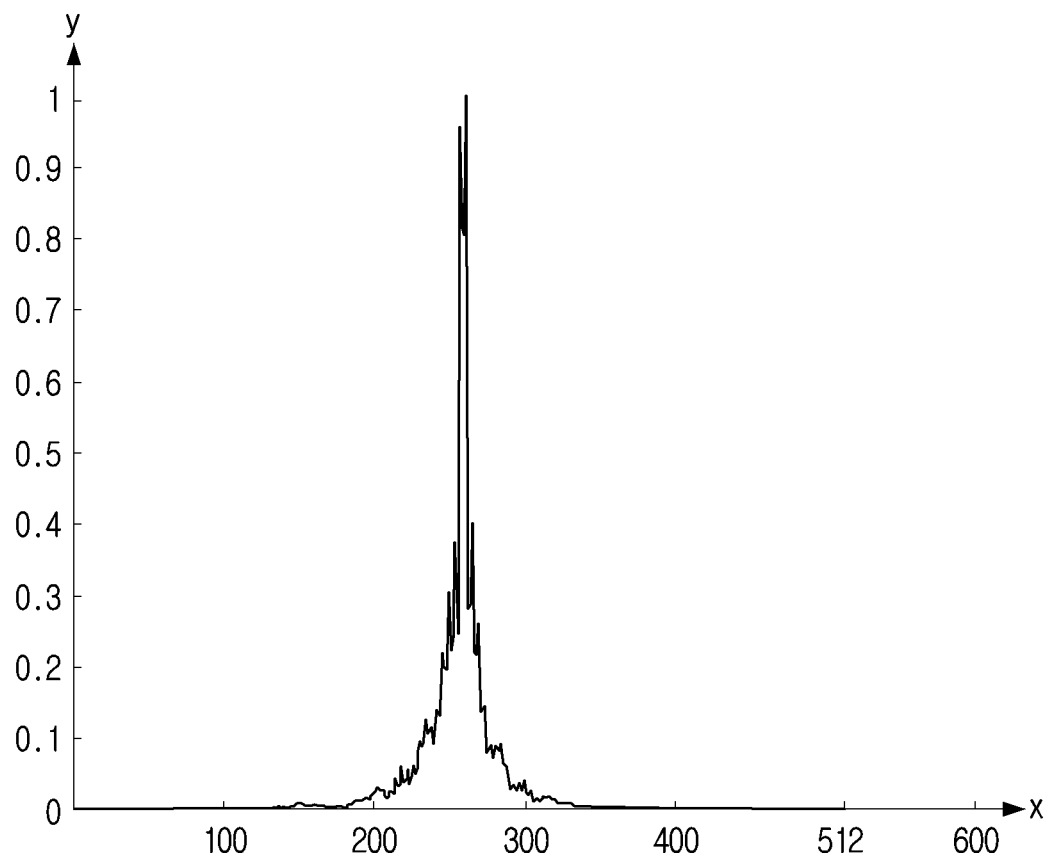
FIG. 5B is a graph illustrating a spatial frequency and a spatial frequency intensity for one area of the spectrum of FIG. 5A.

FIG. 5A is a view illustrating a two-dimensional Fast Fourier Transform (FFT) spectrum for a TN panel according to an embodiment, and FIG. 5B is a graph illustrating a spatial frequency and a spatial frequency intensity for one area of the spectrum of FIG. 5A.

Specifically, the two-dimensional spectrum of FIG. 5A is a spectrum expressed in a spatial frequency domain through a fast Fourier transform (FFT) of a light and dark form along one line among images photographed with an aperture shape for a TN panel as shown in FIG. 3A. The x-axis and y-axis components of the spectrum of FIG. 5A are frequency components and may be in units of Hertz (Hz). In addition, as the color of areas appearing in the spectrum is darker, it may mean that the intensity with respect to the corresponding spatial frequency is greater. In other words, it may be seen from the 2D spectrum of FIG. 5A that the aperture shape of the TN panel as shown in FIG. 3A has the greatest intensity of a spatial frequency of 256 Hz.

FIG. 5B is a graph of the intensity of each spatial frequency for a section in which the intensity of the spatial frequency is concentrated in the 2D FFT spectrum of FIG. 5A. The x-axis of the graph of FIG. 5B represents a frequency component, and the y-axis component represents a component obtained by normalizing a ratio of the intensity with respect to each spatial frequency from 0 to 1. Referring to FIG. 5B, the shape of the aperture for the TN panel as shown in FIG. 3A may be measured to have a maximum spatial frequency of 512 Hz.

Figure 5C:
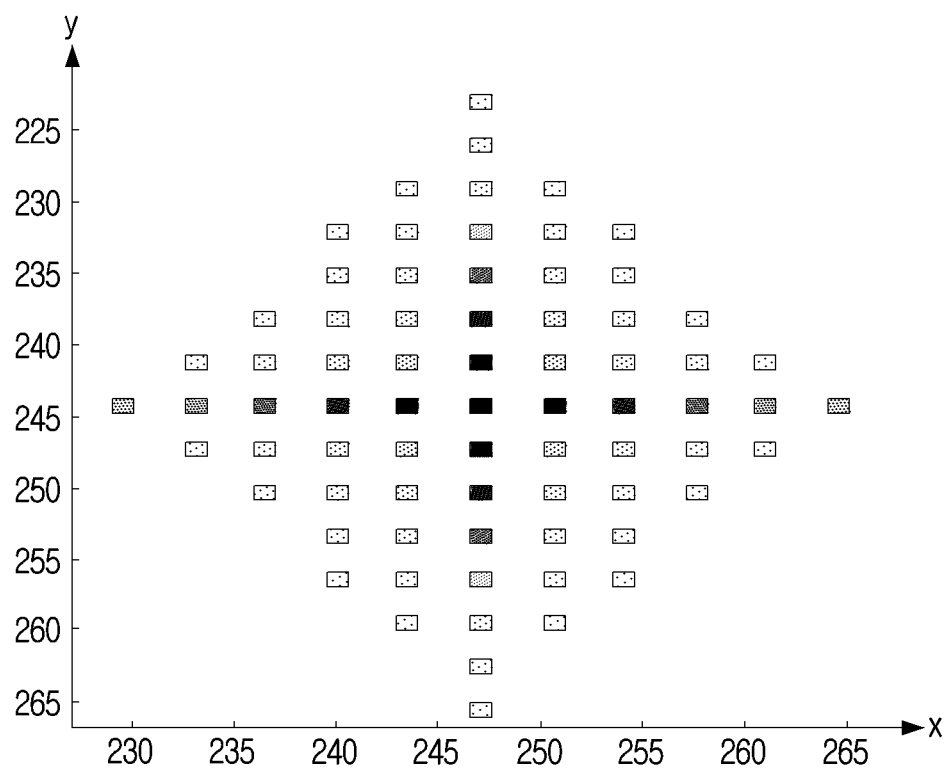
FIG. 5C is a view illustrating a two-dimensional FFT spectrum for a PLS panel according to an embodiment.
Figure 5D:
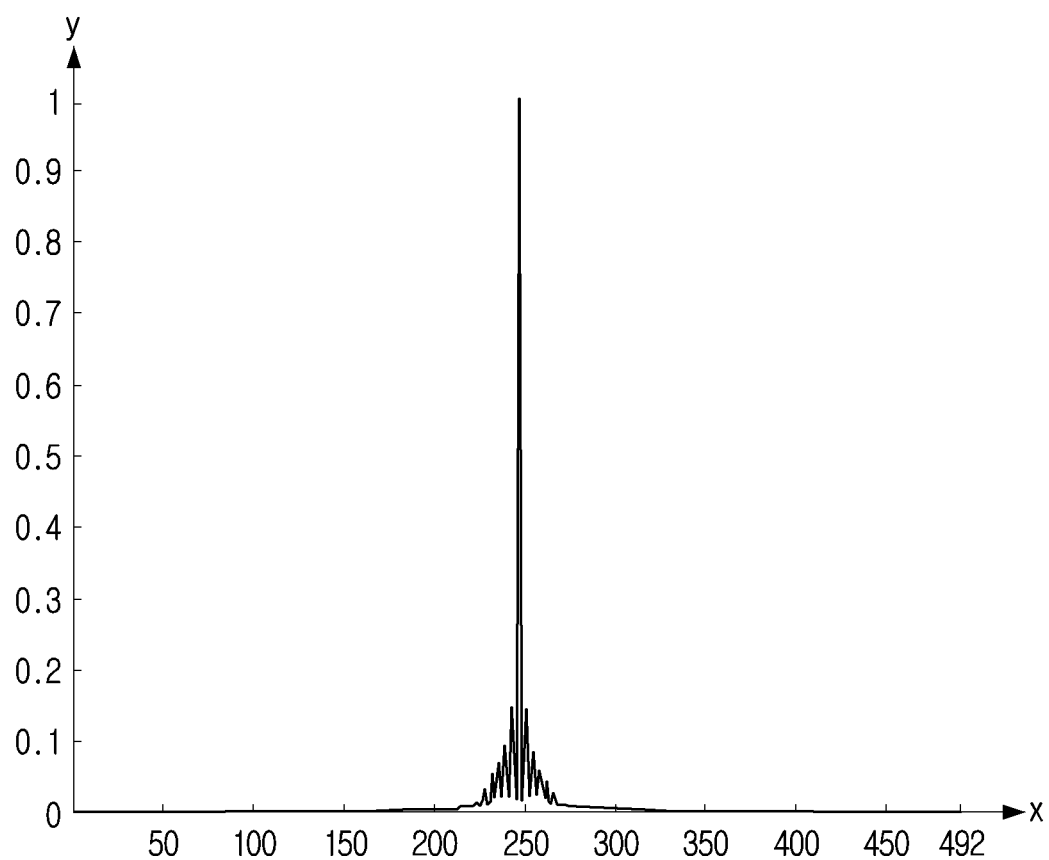
FIG. 5D is a graph illustrating a frequency and a frequency intensity for one area of the spectrum of FIG. 5C.

FIG. 5C is a view illustrating a two-dimensional FFT spectrum for a PLS panel according to an embodiment of the disclosure, and FIG. 5D is a graph illustrating a frequency and a frequency intensity for one area of the spectrum of FIG. 5C.

Specifically, the two-dimensional spectrum of FIG. 5C is a spectrum expressed in a spatial frequency domain through a fast Fourier transform (FFT) of a contrast pattern along one line among images photographed with the aperture shape of the PLS panel as shown in FIG. 3C. It may be seen from the two-dimensional spectrum of FIG. 5C that the aperture shape of the PLS panel as shown in FIG. 3C has the greatest intensity of a spatial frequency of 256 Hz.

In addition, FIG. 5D is a graph of the intensity of each spatial frequency for a section in which the intensity of the spatial frequency is concentrated in the two-dimensional FFT spectrum of FIG. 5C. The x-axis of the graph of FIG. 5D represents a frequency component, and the y-axis component represents a component obtained by normalizing the ratio of the intensity to each spatial frequency from 0 to 1. Referring to FIG. 5D, the shape of the aperture for the PLS panel as shown in FIG. 3C may be measured to have a maximum spatial frequency of 492 Hz.

Accordingly, by measuring an optical profile for each of the TN panel and the PLS panel, a ratio ρ of the maximum spatial frequency (512 Hz) according to the aperture shape of the TN panel and the maximum spatial frequency (492 Hz) according to the aperture shape of the PLS panel may be measured as 1.04.

Through the optical profile measurement described above in FIGS. 4A to 5D, a maximum spatial frequency according to an aperture shape for each display panel may be measured. In addition, the ratio ρ between the maximum spatial frequencies of the two display panels may be calculated through the corresponding measured values.

Figure 6:
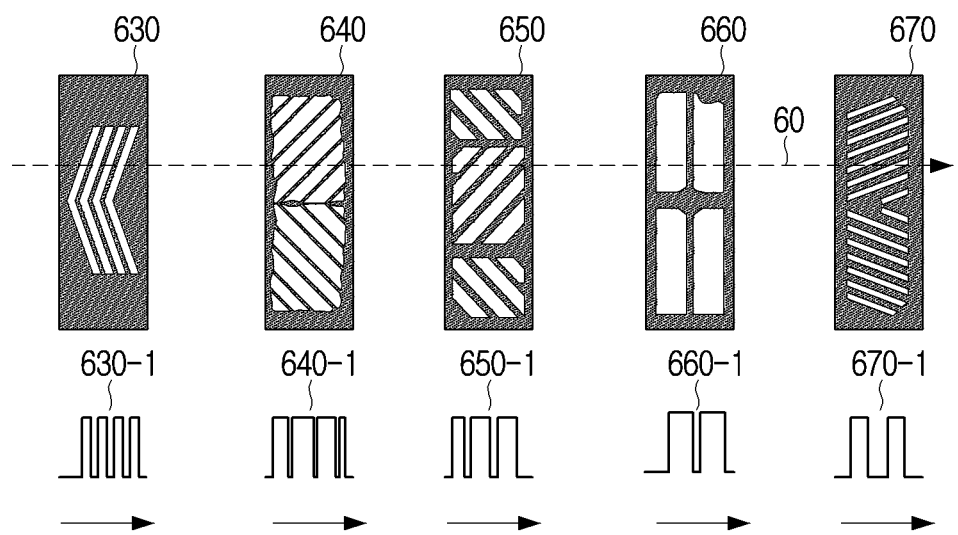
FIG. 6 is a view illustrating an aperture shape of one pixel of each of five display panels and a function of a spatial frequency according to the aperture shape, according to an embodiment.

FIG. 6 is a view illustrating an aperture shape of one pixel of each of five display panels and a function shape for a spatial frequency according to the aperture shape, according to an embodiment.

An image 630 of FIG. 6 shows an image of one pixel emitting light in a S-IPS panel by measuring an optical profile of one pixel in the super-IPS (S-IPS) panel. In addition, a graph 630-1 is a graph showing a form of contrast that appears along one line 60 of the image 630 in the form of a function of a spatial frequency. In other words, the 630-1 graph is a graph in which an area that passes light is high (for example, 1) and an area that does not pass light is low (for example, 0) among the areas of one line 60 in the image 630.

An image 640 represents an image photographing one pixel emitting light in the PVA panel by measuring the optical profile of one pixel in the patterned vertical alignment (PVA) panel. In addition, a graph 640-1 is a graph showing a form of contrast that appears along the one line 60 of the image 640 in the form of a function of a spatial frequency. In other words, the graph 640-1 is a graph in which an area that passes light is high (for example, 1), and an area that does not pass light is low (for example, 0) among the areas of the one line 60 in the 640 image.

An image 650 represents an image of one pixel emitting light in the MVA panel by measuring an optical profile for one pixel in the multi-domain vertical alignment (MVA) panel. In addition, a graph 650-1 is a graph illustrating a form of a contrast appearing along the one line 60 of the image 650 as a function of spatial frequency. In other words, the graph 650-1 is a graph in which an area that passes light is high (for example, 1), and an area that does not pass light is low (for example, 0) among the areas of the one line 60 in the image 650.

An image 660 represents an image of one pixel emitting light in the advanced multi-domain vertical alignment (AMVA) panel by measuring an optical profile for one pixel in the AMVA panel. In addition, a graph 660-1 is a graph illustrating a form of contrast that appears along the one line 60 of the image 660 as a function of a spatial frequency. In other words, the graph 660-1 is a graph in which an area that passes light is high (for example, 1) and an area that does not pass light is low (for example, 0) among the areas of the one line 60 in the image 660.

An image 670 represents an image of one pixel emitting light in the AMVA panel by measuring an optical profile for one pixel in a horizon in-plane switching (H-IPS) panel. In addition, a graph 670-1 is a graph illustrating a form of the contrast appearing along the one line 60 of the image 670 in the form of a function of spatial frequency. In other words, the 670-1 graph is a graph in which an area that passes light is high (for example, 1) and an area that does not pass light is low (for example, 0) among the areas of the one line 60 in the image 670.

In addition, as described above with reference to FIGS. 5A to 5D, the maximum spatial frequency of each of the corresponding display panels may be measured through the fast Fourier transform (FFT) with respect to the graphs 630-1 to 670-1 of FIG. 6. As an example, the maximum spatial frequency ratio ρ between two display panels according to two different display panel types may be measured as shown in Table 1 below.

TABLE 1

| Display panel type | ρ |
| --- | --- |
| PLS-AMVA | 1.03 or 0.97 |
| TN-HIPS | 1.03 or 0.97 |
| TN-PLS | 1.04 or 0.96 |
| TN-SIPS | 1.04 or 0.96 |
| AMVA-HIPS | 1.04 or 0.96 |
| TN-MVA | 1.06 or 0.943 |
| TN-PVA | 1.07 or 0.934 |
| AMVA-SIPS | 1.16 or 0.862 |
| SIPS-PLS | 1.27 or 0.787 |

Referring to Table 1, a ratio of a maximum spatial frequency according to the aperture shape of the S-IPS panel and a maximum spatial frequency according to the aperture shape of the PLS panel is 1.27 or 0.787, which is the largest difference from the predetermined range (e.g., 0.97 to 1.03). For example, when the first display panel is a S-IPS panel and the second display panel is a PLS panel, the ratio of the maximum spatial frequency may be measured as 1.27. In addition, when the first display panel is the PLS panel and the second display panel is the SIPS panel, the ratio of the maximum spatial frequency may be measured as 0.787. In other words, when the stacked display apparatus 100 is implemented with a plurality of display panels including the S-IPS panel and the PLS panel, the moire reduction effect may be relatively large.

In other words, the stacked display apparatus 100 may provide an image with a reduced moire phenomenon, since the stacked display apparatus 100 is implemented with a plurality of display panels having a maximum frequency ratio of 1.03 or more or 0.97 or less for each display panel.

Figure 7:
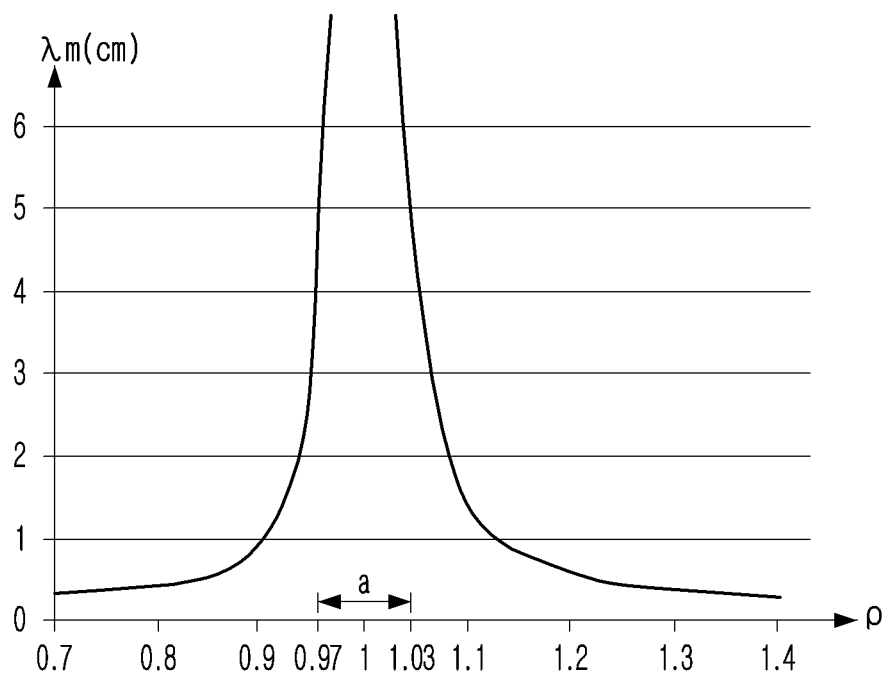
FIG. 7 is a graph of a moire wavelength based on ρ, according to an embodiment.

FIG. 7 is a graph of a moire wavelength based on a ratio ρ according to an embodiment.

FIG. 7 illustrates is a graph of the moire wavelength λm according to a ratio ρ of a first maximum spatial frequency of a first aperture shape and a second maximum spatial frequency of a second aperture shape. As provided in examples above, the stacked display apparatus 100 may include a first display panel having the first aperture shape and a second display panel having the second aperture shape.

The moire wavelength λm is a wavelength of a moire pattern generated by the moire phenomenon, and it may means that the greater the moire wavelength λm, the clearer the moire phenomenon becomes. In other words, the greater the moire wavelength λm, an image output by the stacked display apparatus 100 is more likely to affected by the moire phenomenon.

As an example, when the first aperture shape and the second aperture shape are the same, the ratio ρ of the first maximum spatial frequency and the second maximum spatial frequency according to the second aperture shape may be 1.

Referring to FIG. 7, it may be seen that the moire wavelength decreases as ρ between the two display panels is greater than or less than 1. In addition, when ρ is outside the predetermined range (a), that is, when ρ is greater than or equal to 1.03 or less than or equal to 0.97, there may be an effect of reducing the moire phenomenon.

Figure 8:
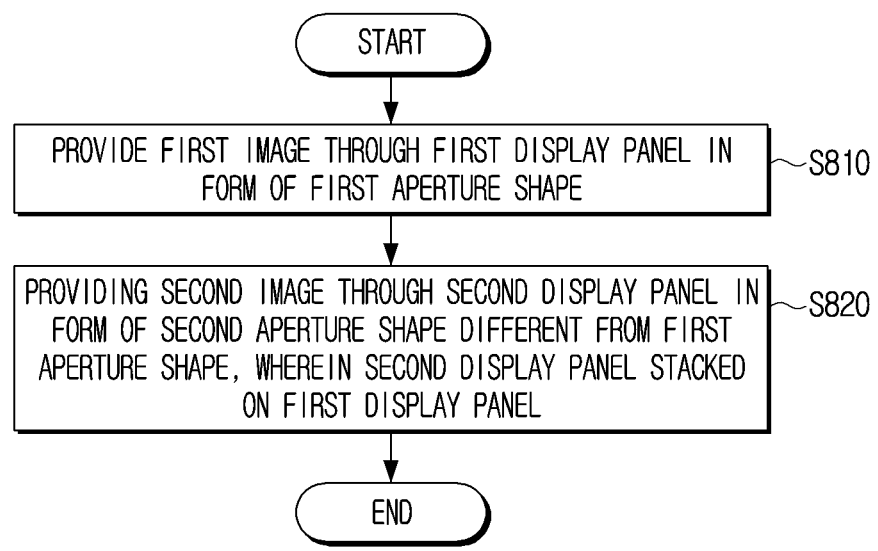
FIG. 8 is a flowchart illustrating a method of providing an image by a stacked display apparatus according to an embodiment.

FIG. 8 is a flowchart illustrating a method of providing an image by a stacked display apparatus according to an embodiment.

The stacked display apparatus 100 may include a first display panel having a first aperture shape and a second display panel having a second aperture shape. In addition, the second display panel may be stacked on the first display panel.

In addition, the stacked display apparatus 100 may provide a first image through a first display panel in the form of the first aperture shape (S810). Also, the stacked display apparatus 100 may provide a second image through a second display panel in a form of a second aperture shape different from the first aperture shape, wherein the second display panel configured to be stacked on the first display panel (S820). As an example, the first image and the second image may be images obtained by converting a light field (LF) image. Also, the first image and the second image may be moving images. The LF image is a set of a plurality of images photographed through a light field (LF) camera, and may include a plurality of images in which one object is photographed from different views. In addition, the LF image may be converted into a first image and a second image and provided to the first display panel and the second display panel of the stacked display apparatus 100, respectively. For example, the first image and the second image may be obtained by performing factorization on the LF image. Factorization is a technique for converting the LF image into an image provided to each of a plurality of display panels of a stacked display apparatus. Although FIG. 8 is illustrated as providing the first image through the first display panel and then providing the second image through the second display panel, the one or more embodiments are not limited thereto, and the operations S810 and S820 may be performed simultaneously.

In order to fully understand the configuration and effects of the disclosure, the embodiments of the disclosure have been described with reference to the accompanying drawings. However, the disclosure is not limited to the embodiments disclosed herein, and may be implemented in various forms and various changes may be added. The description of the embodiments is provided to explain the inventive concept of the disclosure, and to inform the scope of the disclosure to those of those skilled in the art to which the disclosure belongs. In the accompanying drawings, a size of the constituent elements is enlarged and illustrated for convenience of description, and a ratio of each constituent element may be exaggerated or reduced.

In the disclosure, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe various elements regardless of their order and/or importance and to distinguish one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element (e.g., a third element) may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, a phrase "a processor configured to (set to) perform A, B, and C" may refer to a generic-purpose processor (e.g., CPU or application processor) capable of performing corresponding operations by executing a dedicated processor (e.g., embedded processor) for performing corresponding operation, or executing one or more software programs stored in a memory device.

When one component is referred to as being "on" or "in contact with" another component, it is to be understood that it may be directly in contact with or connected on another component, but there may be another component therebetween. On the other hand, when one component is referred to as being "directly on" or "directly in contact with" another component, it is to be understood that there may not be another component therebetween. Other expressions describing a relationship between the components, that is, "between", "directly between", and the like should be similarly interpreted.

The terms such as "first," "second," and so on may be used to describe a variety of elements, but the elements should not be limited by these terms. The terms are only used to differentiate one component from other components. For example, the 'first' component may be named the 'second' component, and vice versa, without departing from the scope of the present disclosure.

Singular forms may include plural forms unless the context clearly indicates otherwise. The expression such as "comprise" or "have" as used herein is intended to designate existence of a characteristic, number, step, operation, element, part or a combination thereof as specified in the description, and should not be construed as foreclosing possible existence or addition of one or more of the other characteristics, numbers, steps, operations, elements, parts or a combination thereof.

Unless indicated otherwise, terms used in the embodiments of the disclosure may be interpreted as meanings commonly known to those skilled in the art.

Each of the above-described constituent elements of the electronic device according to various embodiments of the present disclosure may be configured by one or more components, and the name of the corresponding constituent element may differ depending on the kind of the electronic device. The electronic device according to various embodiments of the present disclosure may be configured to include at least one of the above-described constituent elements, and may omit some constituent elements or may further include other additional constituent elements. Also, the description of the exemplary embodiments of the present disclosure is intended to be illustrative, and not to limit the scope of the claims, and many alternatives, modifications, and variations will be apparent to those skilled in the art.

While the present disclosure has been shown and described with reference to various embodiments thereof, it should be understood by those skilled in the art that various changes in form and details may be made therein without departing from the spirit and scope of the present disclosure as defined by the appended claims and their equivalents.

What is claimed is:

1. A stacked display apparatus comprising:
a first display panel in a form of a first aperture shape; and
a second display panel in a form of a second aperture shape that is different from the first aperture shape, the second display panel being stacked on the first display panel,
wherein a ratio of a first maximum spatial frequency of the first aperture shape and a second maximum spatial frequency of the second aperture shape is outside a predetermined range,
wherein the first maximum spatial frequency is obtained by analyzing, by performing a fast Fourier transform method, a frequency component of first data on the first aperture shape obtained through measuring a first optical profile of the first display panel, and
wherein the second maximum spatial frequency is obtained by analyzing by performing a fast Fourier transform method, a frequency component of second data on the second aperture shape obtained through measuring a second optical profile of the second display panel.

2. The apparatus of claim 1, further comprising:
a back light unit,
wherein the first display panel is stacked on the back light unit.

3. The apparatus of claim 1, further comprising:
a third display panel in a form of a third aperture and stacked on the second display panel,
wherein a ratio of a third maximum spatial frequency of the third aperture shape and the first maximum spatial frequency is outside the predetermined range, and
wherein the ratio of the third maximum spatial frequency and the second spatial maximum frequency is outside the predetermined range.

4. The apparatus of claim 3,
wherein each of the first data on the first aperture shape and the second data on the second aperture shape comprises a plurality of step functions.

5. The apparatus of claim 1,
wherein a first image is configured to be provided through the first display panel, and a second image is configured to be provided through the second display panel, and
wherein the first image and the second image are obtained by converting a light field (LF) image.

6. The apparatus of claim 1,
wherein a diffuser film is not disposed between the first display panel and the second display panel.

7. The apparatus of claim 1,
wherein the first display panel is a Super In-Plane Switching (S-IPS) panel, and the second display panel is a Plane-to-Line Switching (PLS) panel.

8. The apparatus of claim 1,
wherein the predetermined range is from 0.97 to 1.03, and the ratio of the first maximum spatial frequency of the first aperture shape and the second maximum spatial frequency of the second aperture shape is less than 0.97 or greater than 1.03.

9. The apparatus of claim 1,
wherein a type of the first display panel and a type of the second display panel is different from each other.

10. The apparatus of claim 1,
wherein a resolution of the first display panel and a resolution of the second display panel is different from each other.

11. The apparatus of claim 1, wherein the first display panel is a panel composed of pixels having three colors of Red, Green and Blue, RGB, and the second display panel is a panel composed of only pixels having a single color among RGB,
whereby a color expression method of the first display panel and a color expression method of the second display panel is different from each other.

12. The apparatus of claim 1,
wherein an opening ratio of the first display panel and an opening ratio of the second display panel is different from each other.

13. A method of providing an image of a stacked display apparatus comprising:
providing a first image through a first display panel in a form of a first aperture shape; and
providing a second image through a second display panel in a form of a second aperture shape that is different from the first aperture shape, the second display panel being stacked on the first display panel,
wherein a ratio of a first maximum spatial frequency of the first aperture shape and a second maximum spatial frequency of the second aperture shape is outside a predetermined range,
wherein the first maximum spatial frequency is obtained by analyzing, by performing a fast Fourier transform method, a frequency component of first data on the first aperture shape obtained through measuring a first optical profile of the first display panel, and
wherein the second maximum spatial frequency is obtained by analyzing by performing a fast Fourier transform method, a frequency component of second data on the second aperture shape obtained through measuring a second optical profile of the second display panel.

14. The method of claim 13,
wherein the first image and the second image are obtained by converting a light field (LF) image.

15. The method of claim 13,
wherein the predetermined range is from 0.97 to 1.03, and the ratio of the first maximum spatial frequency of the first aperture shape and the second maximum spatial frequency of the second aperture shape is less than 0.97 or greater than 1.03.

* * * * *